April 5, 1966  R. FORMAN  3,244,914
THERMOELECTRIC CONVERSION PROCESS AND APPARATUS
Filed March 20, 1962  5 Sheets-Sheet 1

INVENTOR.
RALPH FORMAN
BY
ATTORNEY

Fig. 5.

April 5, 1966 R. FORMAN 3,244,914
THERMOELECTRIC CONVERSION PROCESS AND APPARATUS
Filed March 20, 1962 5 Sheets-Sheet 4

INVENTOR.
RALPH FORMAN
BY
John F. Hohmann
ATTORNEY

April 5, 1966 R. FORMAN 3,244,914
THERMOELECTRIC CONVERSION PROCESS AND APPARATUS
Filed March 20, 1962 5 Sheets-Sheet 5

Fig. 9.

INVENTOR.
RALPH FORMAN
BY
ATTORNEY

United States Patent Office 3,244,914
Patented Apr. 5, 1966

3,244,914
THERMOELECTRIC CONVERSION PROCESS
AND APPARATUS
Ralph Forman, Rocky River, Ohio, assignor to Union
Carbide Corporation, a corporation of New York
Filed Mar. 20, 1962, Ser. No. 183,321
17 Claims. (Cl. 310—4)

This application is a continuation-in-part of co-pending United States application bearing Serial No. 147,605, filed October 25, 1961, now abandoned, and entitled, "Thermoelectric Conversion Process and Apparatus."

The invention relates generally to a process and apparatus for converting heat energy to electrical energy and, more particularly, to a process and apparatus for converting heat energy directly into alternating electrical current by thermionic emission from a hot body.

Heretofore, a great variety of thermionic generators have been proposed for converting heat energy directly into electrical energy. Although most of these devices convert the heat to direct electrical current, it has been generally recognized that a thermionic generator of alternating current would offer many advantages over the conventional direct-current generators. For example, an alternating-current generator may be used with conventional power-transmission systems, including transformers to adjust the voltage of the power delivered; this is particularly difficult with the low-voltage, high-current output of the conventional direct-current thermionic generators.

It is, therefore, the main object of the present invention to provide a process and apparatus for converting heat energy directly into an alternating electrical current.

It is another object of the invention to provide such a process and apparatus wherein the alternating electrical current is produced by thermionic emission in an ionizable gas.

It is a further object of the invention to provide such a process wherein the ionizable gas is ionized so as to neutralize the space charge surrounding the emitter.

A still further object is to provide such a process and apparatus wherein the thermionic work function of the emitter may be higher or lower than the ionization potential of the gas.

Another object of the invention is to provide such a process and apparatus wherein the cathode has a relatively long life.

Other aims and advantages of the invention will be apparent from the following description and appended claims.

As used herein, the term "° C." as applied to temperature figures over 800 refers to ° C. brightness as measured by an optical pyrometer.

In accordance with the present invention, there is provided a thermoelectric converter comprising a cathode and an anode disposed in an ionizable gas, the cathode being electrically connected to the anode through an external load circuit, the temperature of the cathode being sufficiently high to effect thermionic emission therefrom and the temperature of the anode being below the temperature of the cathode and sufficiently low that the thermionic emission from the anode is negligible in comparison with the thermionic emission from the cathode; and a source of ionizing radiation for irradiating the ionizable gas, the pressure of the ionizable gas and the dose rate of the ionizing radiation being sufficient to produce an ion concentration sufficiently high to make the current output of the converter temperature dependent, the ionizable gas containing a sufficient amount of at least one gas selected from the group consisting of krypton, argon, xenon, and isotopes thereof to produce a negative-resistance region in the anode current-anode voltage characteristic, the cathode having a thermionic work function sufficiently greater than the thermionic work function of the anode to move the negative-resistance portion of the anode current-anode voltage characteristic into the area of negative anode voltage, and the impedance of the external load being such that the load line therefor intersects the negative-resistance portion of the anode current-anode voltage characteristic in two points. The ionizing radiation employed in the inventive converter is preferably at least one type of charged particles selected from the group consisting of beta particles, protons, deuterons, tritons, alpha particles, and high-energy electrons. The inventive converter produces an A.-C. output because of the negative-resistance region produced in the anode current-anode voltage characteristic. Of course, it is also necessary to adjust the load line so that it intersects this negative-resistance portion of the characteristic curve in two points.

A load line is a line which intersects the anode voltage axis at the voltage of the D.-C. input (zero in the case of a generator) and whose slope is determined by the impedance of the external load. The load line can be varied by changing the load resistance or the magnitude of the applied D.-C. voltage.

The ionizing radiation employed in the present invention may be produced by any convenient process. For example, beta particles may be obtained from beta decay of a radioactive nuclide such as krypton-85, and high energy electrons may be obtained from gamma radiation as a result of the photoelectric process, Compton scattering, or pair production. High-energy protons or deuterons may be produced as a result of collisions of fast neutrons in a nuclear reactor with hydrogen or deuterium. High-energy protons and tritons may be produced in a nuclear reaction by the absorption of slow neutrons in a material having nuclei with a high cross-section for an n, p or n, alpha reaction. Alpha particles may be obtained from alpha decay of radioactive nuclides such as radon.

The rate of formation of gas ions in the space between the cathode and anode is determined mainly by the pressure and type of the ionizable gas around the cathode and anode, and the dose rate of the ionizing radiation, i.e., the energy, type, and flux of ionizing particles employed. The concentration of ions is also dependent on the rate of recombination. By varying these factors, the ion concentration in the gas around the cathode can be increased to the level required to make the current output of the converter temperature dependent, and a cathode operating at a relatively low temperature can be employed. In general, the ion concentration increases with increasing gas pressure, increasing dose rate, and decreasing rate of recombination. When the range of the ionizing particles exceeds the dimensions of the vessel, the ion concentration is somewhat dependent on the geometry of the vessel.

After the ion concentration has been increased sufficiently to cause the current output of the converter to be temperature dependent, the output can be increased even further by continuing to increase the dose rate of the ionizing radiation and/or the pressure of the ionizable gas. The current obtainable by the present process in a given device is higher than the current obtainable with a vacuum in the same device. However, if the gas pressure is increased beyond certain limits, the output of the device usually levels off and then decreases.

A negative-resistance portion in the anode current-anode voltage characteristic is a region where an increase in the anode voltage results in a decrease rather than an increase in the anode current. In the present invention, a negative-resistance portion is created in the anode current-anode voltage characteristic by employing krypton, argon, xenon, and/or isotopes thereof, as at least a portion of the ionizable gas. Some forms of these gases, such as krypton-85, may also serve as the source of ionizing radiation. The only requirement on the amount of krypton, argon, and/or xenon employed is that it be sufficient to produce a negative-resistance region in the anode current-anode voltage characteristic at the particular gas pressure and dose rate employed. It is generally preferred to use one or more of the three gases, including isotopes thereof, as at least 99% by volume of the ionizable gas. Of course, in the case of fission-product krypton, 100% of the gas is krypton and krypton isotopes. Once the negative-resistance region has been created, the device can be made to produce an alternating current by electrically connecting the cathode and anode to an external load having an impedance such that the load line therefor intersects the negative-resistance portion of the anode current-anode voltage characteristic in two points. As used herein, the phrase "intersects in two points" includes situations where the load line coincides with the negative-resistance portion of the curve over a finite distance.

In order to obtain an alternating-current output in the absence of an applied voltage, the negative-resistance portion of the $I_A$-$V_A$ characteristic must be moved into the area of negative anode voltages. Accordingly, the cathode must have a thermionic work function sufficiently greater than the thermionic work function of the anode to move the negative-resistance portion of the anode current-anode voltage characteristic into the area of negative anode voltages. Of course, the generator may also be used with an applied voltage combining to produce the output signal. The frequency of the output signal of the generator may be varied by varying the distance between the cathode and anode, by varying the dimensions of the generator, by varying the pressure of the gas, by varying the load circuit, or by any other suitable means.

The source of the ionizing radiation may be the gas between the cathode and the anode, the cathode, the anode, or in any other form suitable for ionizing the gas. However, it is generally preferred to have the source of ionizing radiation in the form of a gas between the cathode and anode. The radiating gas may itself be the ionizable gas, or it may be mixed with other ionizable gases. Also, more than one type of radioactive gas may be employed.

One source of ionizing radiation suitable for use in the present invention is a source of slow neutrons, such as a nuclear reactor, in combination with a material having nuclei with a high cross section for an n, p (neutron in, alpha particle out) reaction or n, alpha (neutron in, alpha particle out) reaction. Examples of such materials are boron-10, lithium-6 and helium-3. The boron and lithium are solids and may be disposed within the ionizable gas in the diode in the form of a coating on the anode or on the inner walls of the diode container. Such coatings may be formed, for example, by electroplating. The boron-10 or lithium-6 need not be used in elemental form, but may be contained in a suitable compound, such as $TiB_2$. Helium-3 is a gas and may be mixed with the ionizable gas, preferably in an amount such that the resulting gas mixture contains less than about 10% by volume helium-3. Absorption of slow neutrons from the reactor or other neutron source in helium-3, for example, produces high-energy protons and tritons with kinetic energies of about 0.6 mev. and 0.2 mev., respectively. In a reactor having a slow neutron flux of $10^{12}$ neutrons/cm.$^2$-sec., pure helium-3 at a pressure of one atmosphere in a container having a radius greater than the 6-cm. range of the protons would be subjected to a dose rate of $4 \times 10^{10}$ rads per hour (in the center of the container) from the products of the n, p reaction. With identical conditions in a vessel having a radius of one centimeter, the dose rate would be about $10^{10}$ rads per hour and the rate of ion formation would be $10^{15}$ ions/cc.-sec. When the ionizable gas is at least 99% by volume krypton, argon, or xenon, the preferred dose rate in the ionizable gas in this embodiment of the invention is 0.1 to 10,000 megarads per hour, and the preferred pressure range for the gas is 0.1 to 200 millimeters of mercury. However, it is to be understood that the lowest specified pressure may not be used with the lowest specified dose rate. For example, with krypton at a pressure of one millimeter, a dose rate of at least 100 megarads per hour is usually required to produce a negative-resistance region. Also, the dose rates and pressures required vary somewhat with the different gases. For example, xenon produces a negative-resistance region at a slightly lower pressure than krypton at a given dose rate. However, it is a simple matter to adjust the dose rate and pressure within the given ranges until the negative-resistance region appears. Although helium-3 is referred to herein as a source of ionizing radiation, it is to be understood that helium-3 becomes a source of ionizing radiation only when used with a sufficiently high neutron flux from a nuclear reactor to give the n, p reaction.

Another source of ionizing radiation suitable for use in the present invention is fission-product krypton. As used herein, the term "fission-product krypton" refers to a gas containing about 5% by volume krypton-85 and about 95% by volume stable fission-product krypton isotopes when fresh. Of course, as the fission-product krypton becomes older, the proportion of krypton-85 therein slowly decreases. The krypton-85 decays to rubidium-85, which is a stable isotope of rubidium. The fission-product krypton serves both as the ionizable gas and as the source of ionizing radiation (beta particles), and also makes possible the negative-resistance region in the anode current-anode voltage characteristic. Fission-product krypton is a relatively abundant and easily isolated fission product having a specific activity of 21 curies per gram when fresh. Krypton-85 is a nearly pure (99.4%) beta emitter with a half-life of 10.5 years. When fresh fission-product krypton is employed in the present invention, a gas pressure of between 10 and 150 of mercury is usually required to produce a negative-resistance region in the anode current-anode voltage characteristic and a concentration of gas ions sufficient to reduce the space charge around a cathode (in the center of a vessel having a radius greater than the range of the beta particles) sufficiently to cause the current output of the diode to be temperature dependent. The negative-resistance region usually disappears at pressures below 10 and about 150 mm. of mercury in the case of fission-product krypton. It is generally preferred to use a pressure of at least 130 mm. of mercury for greater efficiency.

Another source of ionizing radiation suitable for use in the present invention is radon, which is an alpha-emitting gas. About 1.0 millicurie of radon 222 and its short-lived decay products in natural krypton at a pressure of about 20 mm. of mercury produces a negative-resistance region and a concentration of gas ions sufficient to reduce the space charge around a cathode (in the center of a vessel having a radius greater than the range of the alpha particles) sufficiently to make the current output of the diode temperature dependent.

Still another source of ionizing radiation is a source of gamma rays, such as cobalt-60 or a nuclear reactor, in combination with a diode filled with a rare gas. Absorption of gamma rays from the cobalt-60 or reactor in the walls (such as glass) and electrodes of the diode produces high-energy electrons which, in turn, ionize the rare gas within the diode. In this embodiment, the gamma-ray source may be located completely outside the gas to be ionized. It is preferred to have the dose rate from the high-energy electrons between about 0.05 and about 10,000 megarads per hour, and the rare gas, such as krypton, within the diode should be at a pressure of 1 to 150 millimeters of mercury. As explained above in connection with the slow neutron source, it is to be understood that the lowest specified pressure may not usually be used with the lowest specified dose rate, but that these two conditions are simply varied within the given ranges until the negative-resistance region appears. The efficiency of the device is generally higher at the higher dose rates.

Any suitable electron-emitting material may be employed as the cathode in the present invention, regardless of whether its work function is greater than, equal to, or less than the ionization potential of the particular ionizable gas or gases employed. Typical examples of suitable cathode material are tungsten, which has a work function of 4.6 ev., thoriated tungsten, which has a work function of 2.6 ev., nickel impregnated with barium and strontium, and tungsten impregnated with barium and strontium. These last two materials are excellent emitters and can operate at relatively low temperatures. In order to obtain an output voltage from the inventive converter, the cathode must have a thermionic work function greater than that of the anode and must be electrically connected to the anode through an external load. Also, as mentioned above, the cathode must have a thermionic work function sufficiently greater than the thermionic work function of the anode to move the negative-resistance portion of the anode current-anode voltage characteristic into the area of negative anode voltage. When any of the cathode materials mentioned above is employed, the anode material may be an oxide cathode material (e.g., nickel coated with porous barium oxide-strontium oxide, which has a work function of about 1.0 ev.) or other suitable anode materials, such as nickel, tungsten or tantalum coated with cesium and rubidium or other alkali metals. The anode temperature must be continuously maintained below the temperature of the cathode and sufficiently low that the thermionic emission from the anode is negligible in comparison with the thermionic emission from the cathode; the relative temperatures of the cathode and anode are preferably such that the thermionic emission from the anode is less than about 0.1% of the emission from the cathode. The only requirement on the cathode temperature is that it be sufficiently high to achieve effective thermionic emission therefrom. Although the spacing between the cathode and anode is not critical to the operability of the present invention, the efficiency of the process may be varied to some degree by varying the spacing.

In addition to the ions produced by ionizing radiation, there may be some gas ions produced by thermal ionization.

An experimental embodiment of the inventive process and apparatus will now be described by referring to the drawings.

Figures 1, 2:
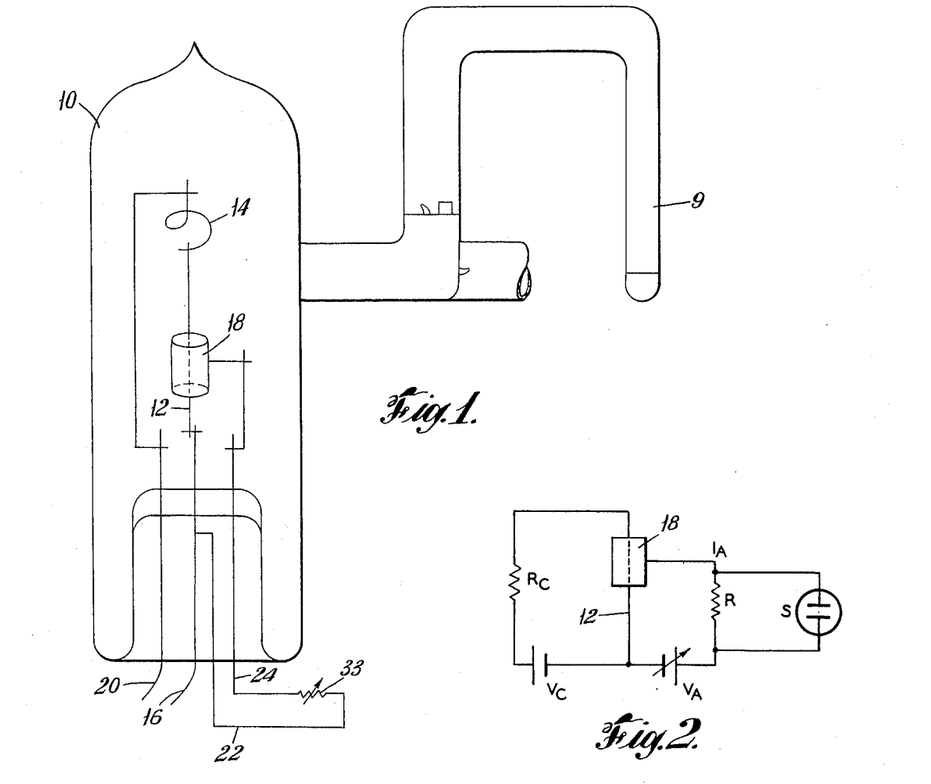
FIG. 1 is a schematic diagram of experimental apparatus for carrying out the inventive process.
FIG. 2 is a diagram of a circuit for determining when the space charge has been neutralized in the apparatus of FIG. 1.

A schematic view of the experimental apparatus is shown in FIG. 1. A radioactive gas is contained at the required presusre in a Pyrex glass envelope 10. A cathode filament 12 is disposed within the gas and is supported at the top by a tantalum spring 14 and an electrically conductive lead 20 and at the bottom by an electrically conductive lead 16. The cathode 12 is heated to the temperature required to achieve effective thermionic emission therefrom by an electrical current passed through leads 16 and 20 from an external power source (not shown). An anode 18 surrounds the cathode filament 12 in the form of a cylindrical sleeve. Lead 22 from the cathode and lead 24 from the anode connect the generator to an external load circuit 33.

In order to determine the exact gas pressure, dose rate, and percentage of krypton, argon, and xenon required to produce a negative-resistance region in the anode current-anode voltage characteristic of the device of FIG. 1 and to make the current output temperature dependent, the device is placed in the circuit shown in FIG. 2. Referring to FIG. 2, $V_c$ is the voltage required to heat the cathode 12 and is connected across the cathode through a resistance $R_c$ with the polarity shown. A variable voltage $V_A$ is then connected across the anode 18 through a load resistance R, and the resulting current $I_A$ is measured as $V_A$ is varied. By plotting the $I_A$–$V_A$ characteristics at increasing gas pressures, dose rates, and/or percentages of krypton, argon, or xenon, it can be determined at what conditions the negative-resistance region is produced in the characteristic and at what conditions the characteristic becomes temperature dependent. The current output may then be further increased by continuing to increase the gas pressure and/or the dose rate.

Figure 3:
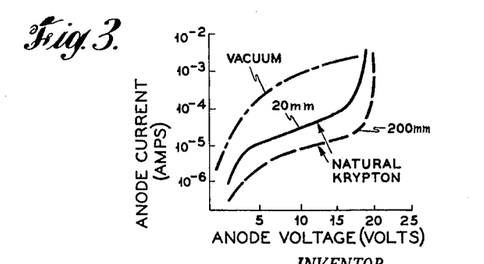
FIG. 3 is a graph showing the anode current-anode voltage characteristics obtained with a vacuum and various pressures of natural krypton gas in the apparatus of FIG. 1 with the work function of the anode greater than the work function of the cathode.

In an example of the aforedescribed process for determining the gas pressure and dose rate required to make the output temperature dependent, a tube such as that shown in FIG. 1 was prepared with a thoriated tungsten cathode filament and a tantalum anode sleeve. The tube was about 6 inches long and about 40 mm. in diameter with the electrodes located in the center of the tube. The tube was placed in the circuit shown in FIG. 2 and the anode current-anode voltage characteristic was taken both in a vacuum and in various pressures of natural krypton. The temperature of the cathode was about 1500° C., while the temperature of the anode was less than 500° C. The spacing between the cathode and anode was about 0.5 cm. The curves obtained are shown in FIG. 3. The ordinate in FIG. 3 is the current $I_A$ indicated in the circuit shown in FIG. 2, and the abscissa is the voltage $V_A$ indicated in FIG. 2. Each of the curves obtained with the vacuum and the natural krypton was independent of filament temperature (space charge limited) over a range of 1550 to 1750° C.

Figure 4:
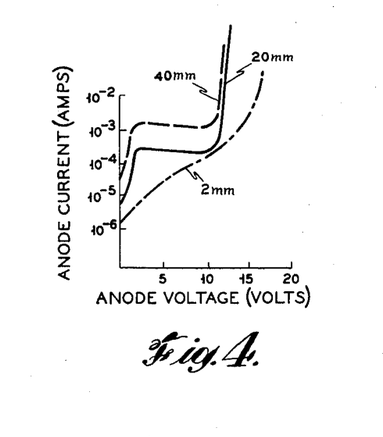
FIG. 4 is a graph showing the anode current-anode voltage characteristics obtained with various pressures of fission-product krypton in the apparatus of FIG. 1 with the work function of the anode greater than the work function of the cathode.
Figure 5:
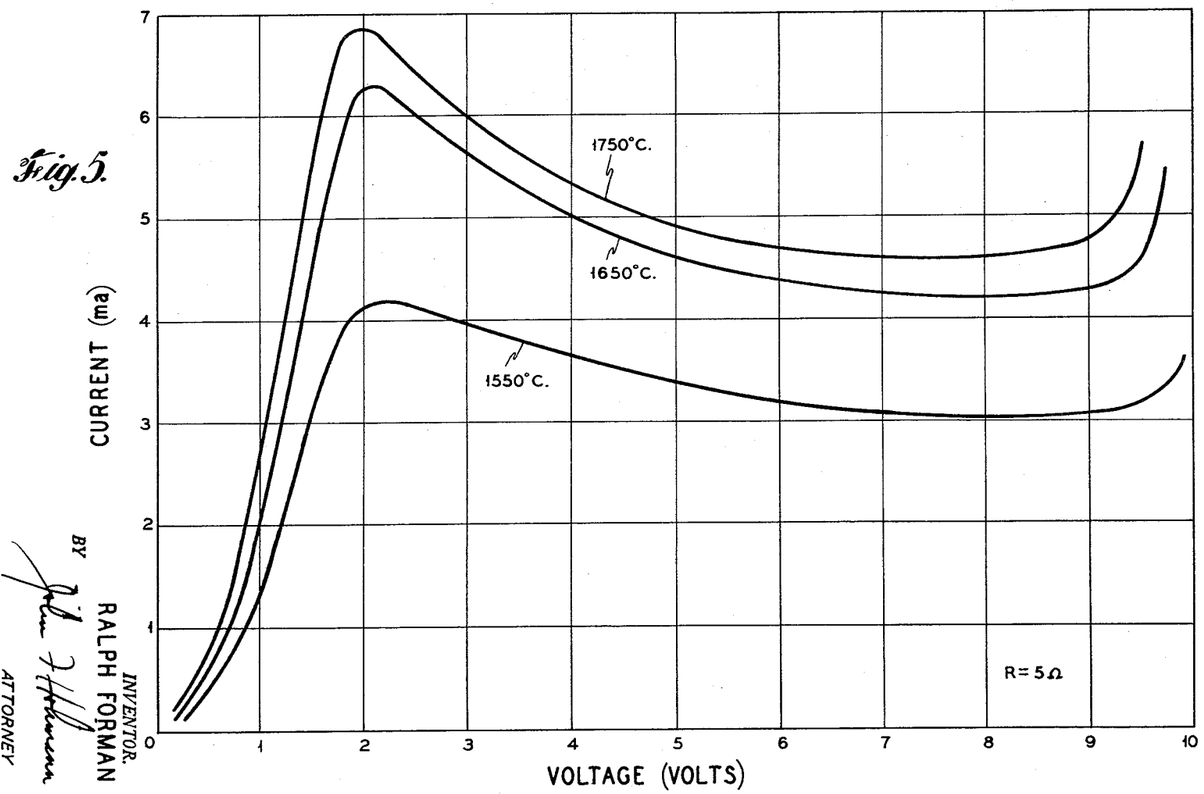
FIG. 5 is a graph showing the anode current-anode voltage characteristics obtained at various filament or cathode temperatures with fission-product krypton in the apparatus of FIG. 1 at a pressure of 40 mm. with the work function of the anode greater than the work function of the cathode.

The tube was then evacuated, filled with radioactive fission-product krypton, and placed in the same circuit. The cathode and anode temperatures and the spacing between the cathode and anode were the same as when the vacuum and ordinary krypton were employed. Anode current-anode voltage characteristics were again taken at various pressures and various temperatures at each pressure; the gas pressure was varied by varying the temperature around a cold finger, such as 9 in FIG. 1. The anode current-anode voltage curves obtained for the fission-product krypton are shown in FIG. 4. It can be seen from the curves that a negative-resistance region was produced at the higher pressures and that the current output increased with increasing pressures of fission-product krypton. Moreover, at pressures of 20 mm. and above, the curves became temperature dependent. The negative-resistance region and the temperature dependence of the $I_A$-$V_A$ characteristic at a pressure of 40 mm. and over a temperature range of 1550 to 1750° C. is shown in FIG. 5. As can be seen from the curves in FIG. 5, a negative-resistance region was present in each characteristic taken at 40 mm. and extended over a range of anode voltages of about 2 volts to about 7 volts, i.e., an increase in the anode voltage in that range resulted in a decrease rather than an increase in the anode current. Also, the $I_A$-$V_A$ curve was clearly temperature dependent over the range of 1550 to 1750° C., thus indicating that the beta emission from the $Kr^{85}$ increased the ion concentration sufficiently to partially neutralize the space charge, thereby permitting more electrons to flow. The 2-mm. curve in FIG. 4 was still temperature independent because the ion concentration at that pressure did not sufficiently neutralize the space charge. At the pressure of 40 mm. of mercury, there were about two curies of $Kr^{85}$ in the tube, and the dose rate was about 0.10 megarads per hour; at a pressure of 20 mm. of mercury, there was about one curie of $Kr^{85}$ in the tube, and the dose rate was about 0.025 megarad per hour. No output current was produced at $V_A=0$ because the tantalum anode had a work function (4.0 ev.) greater than that of the thoriated tungsten cathode (2.6 ev.).

Figure 6:
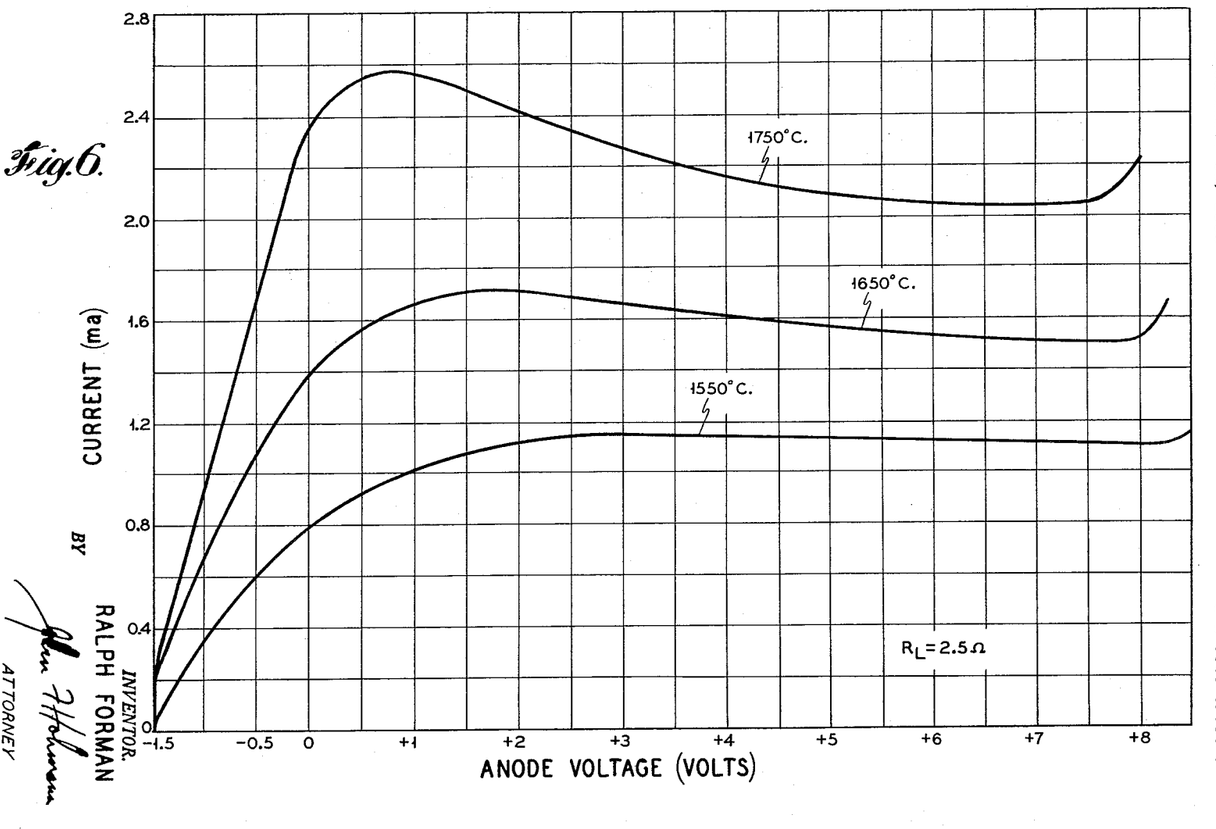
FIG. 6 is a graph showing the anode current-anode voltage characteristics obtained at various filament or cathode temperatures with fission-product krypton in the apparatus of FIG. 1 at a pressure of 120 mm. with the work function of the anode less than the work function of the cathode.

After it had been determined at what conditions the fission-product krypton would produce a negative-resistance region and make the current output temperature dependent, the tantalum anode was replaced with an anode of oxide cathode material. Since the oxide cathode material had a work function (1.0 ev.) well below that of the cathode (2.6 ev.), as opposed to the 4.0 ev. work function of the tantalum anode, the device could now produce an output current in the absence of an applied voltage, i.e., at $V_A=0$. In order to illustrate the operation of the device as a generator it was again placed in the circuit of FIG. 2 and the $I_A$-$V_A$ characteristic taken at various pressures and temperatures. The curves obtained with the fission-product krypton gas at a pressure of 120 mm. of mercury over a temperature range of 1550 to 1750° C. are shown in FIG. 6. It can be seen from the curves of FIG. 6 that a substantial current was produced at $V_A=0$. Also, a negative-resistance region was still present in the curves and the output was still temperature dependent. Results similar to those described above for the thoriated tungsten cathode and tantalum anode were obtained with an oxide cathode filament and a tantalum anode. FIGS. 5 and 6 also show that the negative-resistance portion of the $I_A$-$V_A$ characteristic was moved toward the area of negative anode voltages by lowering the anode work function without changing the cathode work function or any other design features of the inventive diode. In the tube used to obtain the curves of FIGS. 5 and 6, the negative-resistance portion of the $I_A$-$V_A$ curve is moved into the area of negative anode voltages by using a tungsten cathode (work function of 4.6 ev.) with the anode of oxide cathode material (work function of 1.0 ev.). By the proper design of geometry, spacing of electrodes, gas pressure, and radiation dosage, the negative-resistance characteristic is then adjusted so that the load line intersects the negative-resistance portion of the curve in at least two points in the area of negative anode voltages, thus generating an A.-C. output.

Figure 9:
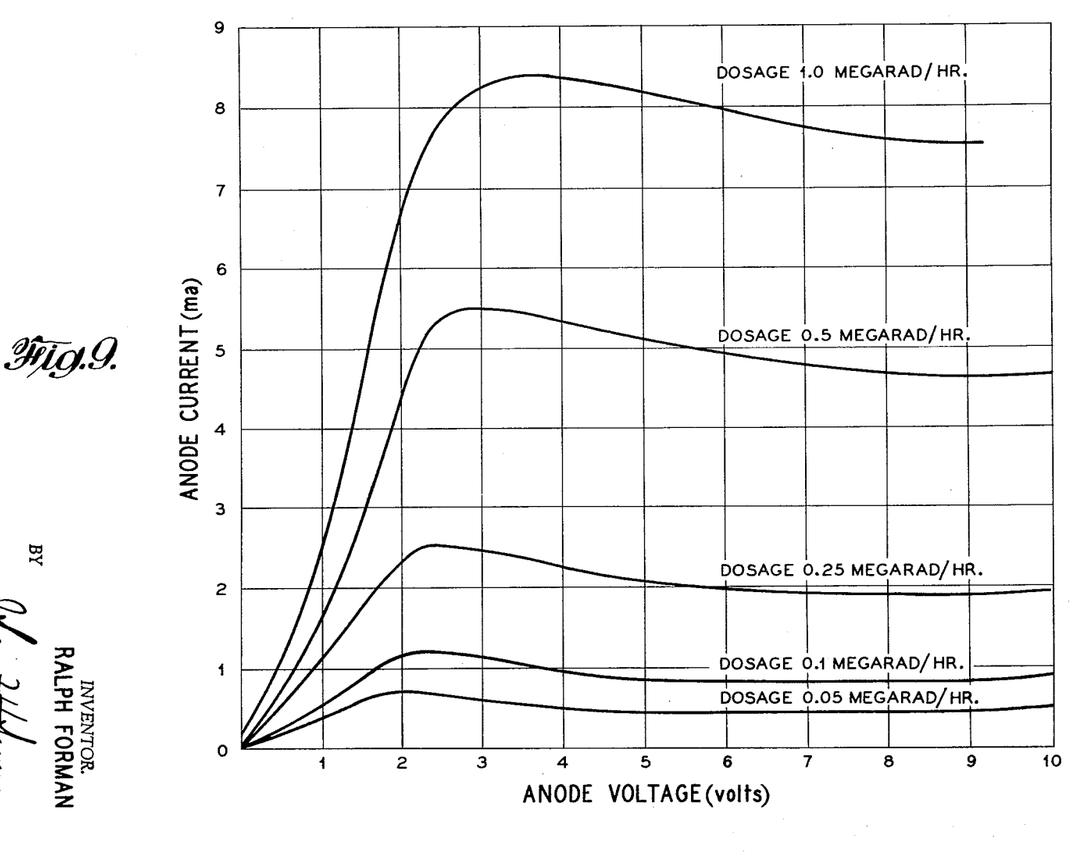
FIG. 9 is a graph showing the anode current-anode voltage characteristics obtained at various dose rates of the ionizing electrons with natural krypton at a pressure of 80 mm. in the apparatus of FIG. 1.

In another example of the invention, a tube similar to that shown in FIG. 1 was prepared with a thoriated tungsten cathode (2.6 ev.) and a tantalum anode (4.0 ev.). The tube was filled with natural krypton gas at a pressure of 80 mm. of mercury and subjected to gamma rays from cobalt-60. The tube was then placed in the circuit shown in FIG. 2, and anode current-anode voltage characteristics were taken at various dose rates. The temperature of the cathode was about 1650° C., while the temperature of the anode was less than 400° C. The spacing between the cathode and anode was about 0.5 cm. The curves obtained are shown in FIG. 9. It can be seen from the curves that the current output increased with increasing dose rates. At dose rates up to 0.5 megarad/hr., the maximum current varied almost directly in proportion to the dose rate; between 0.5 and 1.0 megarad/hr., the increase in current was less than proportional to the increase in dose rate, indicating that the current was becoming plasma-limited.

When fission-product krypton is employed as the ionizable gas in the inventive converter, the gas is 100% krypton and krypton isotopes, and there is no question of what amount of krypton, argon, and/or xenon is required to produce a negative-resistance region. However, the same process described above for determining the gas pressure required to make the current output temperature dependent may be used to determine the amount of krypton, argon, and/or xenon required to create a negative-resistance region at a given gas pressure and dose rate, i.e., the $I_A$-$V_A$ curve can be plotted at increasing concentration of one or more of the three gases until the curve acquires a region of negative resistance. In order to move the negative-resistance portion of the $I_A$-$V_A$ curve into the area of negative anode voltage, the thoriated tungsten cathode is replaced with a tungsten cathode. As a result of the relatively large difference between the work function of the tungsten cathode (4.6 ev.) and the work function of the anode of oxide cathode material (1.0 ev.), the negative-resistance portion of the $I_A$-$V_A$ curve is moved into the area of negative-anode voltage.

After the conditions for neutralizing space charge and creating a negative-resistance region in the area of negative anode voltage have been established, the device can be used as an A.-C. generator by electrically connecting the cathode and anode through an external load and varying the impedance of the load until the load line therefor intersects the negative-resistance portion of the curve $I_A$-$V_A$ in two points. When there is no applied voltage, the load line intersects the voltage axis at the point of zero voltage. The device may also be used with an applied D.-C. voltage, which essentially biases the device to deliver A.-C. power. If the A.-C. power delivered is much greater than the power lost by the D.-C. power supply, the device is still very useful for generating A.-C. power even though the load line does not intersect the voltage axis at the point of zero voltage. In such cases, the power output may be greater than, equal to, or less than the power input, and depending on the specific application, any of these results may be acceptable. For example, it may be desired to convert D.-C. to A.-C. with some sacrifice in efficiency.

The exact impedance value required to make the load line intersect the negative-resistance portion of the curve in two points can be determined by connecting an oscilloscope S (see FIG. 2) across the load and varying the impedance of the load until an alternating signal is observed on the oscilloscope or by drawing the desired load line and calculating the required impedance.

Figure 7:
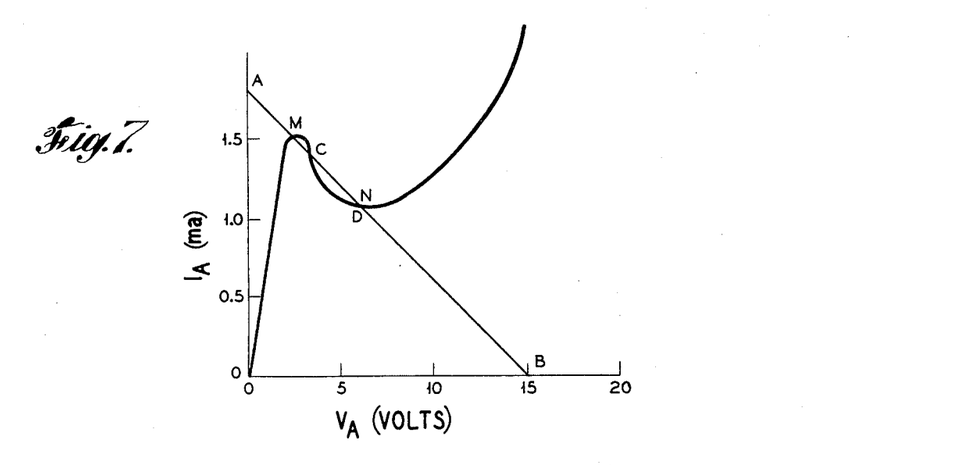
FIG. 7 is a graph showing an anode current-anode voltage characteristic for fission-product krypton in the apparatus of FIG. 1 and a load line intersecting the negative-resistance portion of the $I_A$–$V_A$ characteristic in two points.

An $I_A$-$V_A$ characteristic for fission-product krypton in the tube described above employing a thoriated tungsten cathode and a tantalum anode is shown in FIG. 7. It can be seen that portion MN of the curve is the negative-resistance portion, i.e., an increase in anode voltage in that region produces a decrease rather than an increase in anode current. If the load resistance is adjusted so that the load line AB intersects the negative-resistance portion of the $I_A$–$V_A$ curve in two points (C and D), an alternating output signal is produced.

Figure 8:
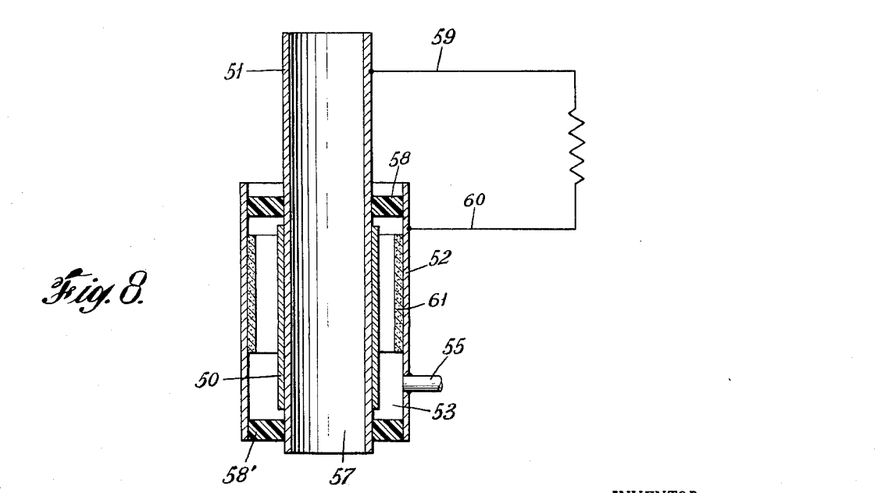
FIG. 8 is an elevational view in cross-section of a preferred embodiment of the inventive apparatus for carrying out the inventive process.

Another form of the inventive apparatus is shown in FIG. 8. This embodiment comprises a pair of concentric conductive cylinders 51 and 52 held in place by insulating end rings 58 and 58' so as to define an annular chamber 53. Affixed to the outer surface of the inner cathode support cylinder 51 is a cathode sleeve 50 of tungsten. Affixed to the inner surface of the outer anode cylinder 52 is an anode sleeve 61 of sprayed oxide cathode coating (work function of 1.0 ev.). The chamber 53 is exhausted through tube 55 and then filled through the same tube with radioactive fission-product krypton at a pressure between 10 and 200 mm. of mercury. The cathode 50 is connected to an external load circuit through conductor 59 while the anode 51 is connected to the same load circuit through conductor 60. The cathode 50 is heated by passing an appropriate hot fuel or gas through the tubular passageway 57. Alternatively, the cathode 50 could be heated by nuclear radiation. In order to maintain the anode 61 at a temperature below that of the cathode 50, the ambient temperature outside the outer cylinder 52 is maintained at a temperature below that of the hot gas in the passageway 57.

Alternatively, the chamber 53 could be filled with natural krypton, xenon, or argon, and helium-3 as a minor constituent, and the entire apparatus placed in a reactor. In such a case, the cylinder 51 could be heated by a uranium fuel element. Similarly, the chamber 53 could be filled with a rare gas and a radioactive cathode or anode material employed. In these cases, the same procedure outlined above could be used to determine the gas pressure and dose rate required to neutralize the space charge and to produce a negative-resistance region.

While various specific forms of the present invention have been illustrated and described herein, it is not intended to limit the invention to any of the details herein shown, but only as set forth in the appended claims.

What is claimed is:

1. A thermoelectric converter comprising a cathode and a anode disposed in an ionizable gas, said cathode being electrically connected to said anode through an external load circuit, the temperature of said cathode being sufficiently high to effect thermionic emission therefrom and the temperature of said anode being below the temperature of said cathode and sufficiently low that the thermionic emission from said anode is negligible in comparison with the thermionic emission from said cathode; and a source of ionizing radiation for irradiating said ionizable gas, the pressure of said ionizable gas and the dose rate of said ionizing radiation being sufficient to produce an ion concentration sufficiently high to make the current output of said converter temperature dependent, said ionizable gas containing a sufficient amount of at least one gas selected from the group consisting of krypton, argon, xenon, and isotopes thereof to produce a negative-resistance region in the anode current-anode voltage characteristic, said cathode having a thermionic work function sufficiently greater than the thermionic work function of said anode to move the negative-resistance portion of the anode current-anode voltage characteristic into the area of negative anode voltage, the impedance of said external load being such that the load line therefor intersects the negative-resistance portion of the anode current-anode voltage characteristic in two points.

2. The thermoelectric converter of claim 1 wherein said ionizing radiation is at least one type of charged particles selected from the group consisting of beta particles, high energy electrons, protons, deutrons, tritons, and alpha particles.

3. The thermoelectric converter of claim 1 wherein said cathode and anode are electrically connected through said external load circuit and a direct-current source.

4. The thermoelectric converter of claim 3 wherein said cathode is a material selected from the group consisting of thoriated tungsten, nickel impregnated with barium and strontium, and tungsten impregnated with barium and strontium.

5. A thermoelectric converter comprising a cathode and an anode disposed in an ionizable gas, said cathode being electrically connected to said anode through an external load circuit, the temperature of said cathode being sufficiently high to effect thermionic emission therefrom and the temperature of said anode being below the temperature of said cathode and sufficiently low that the thermionic emission from said anode is negligible in comparison with the thermionic emission from said cathode; a material having nuclei with a high cross section for an n, p or n, alpha reaction disposed within said ionizable gas; and means for irradiating said material with slow neutrons so as to produce charged particles which ionize said ionizable gas, the pressure of said gas and the dose of said charged particles being sufficient to produce an ion concentration sufficiently high to make the current tube of said converter temperature dependent, said ionizable gas containing a sufficient amount of at least one gas selected from the group consisting of krypton, argon, xenon, and isotopes thereof to produce a negative-resistance region in the anode current-anode voltage characteristic, said cathode having a thermionic work function sufficiently greater than the thermionic work function of said anode to move the negative-resistance portion of the anode current-anode voltage characteristic into the area of negative anode voltage, the impedance of said external load being such that the load line therefor intersects the negative-resistance portion of the anode current-anode voltage characteristic in two points.

6. The thermoelectric converter of claim 5 wherein said means for radiating said material with slow neutrons is a nuclear reactor.

7. The thermoelectric converter of claim 5 wherein said material disposed within said ionizable gas is at least one material selected from the group consisting of boron-10, lithium-6, and helium-3.

8. The thermoelectric converter of claim 5 wherein the pressure of said ionizable gas is between about 0.1 and about 200 millimeters of mercury, the dose rate of said charged particles is between about 0.1 and about 10,000 megarads per hour, and said ionizable gas contains at least 99% by volume of at least one gas selected from the group consisting of krypton, argon, xenon, and isotopes thereof.

9. A thermoelectric converter comprising a cathode and an anode disposed in a gaseous mixture of at least one gas selected from the group consisting of krypton, argon, and xenon and a gas emitting at least one type of ionizing radiation selected from the group consisting of beta particles, high energy electrons, protons, deutrons, tritons, and alpha particles, the pressure of said gaseous mixture and the dose rate of said ionizing radiation being sufficient to produce an ion concentration sufficiently high to make the current output of said converter temperature dependent, the amount of krypton, argon, and xenon and isotopes thereof in said gaseous mixture being sufficient to produce a negative-resistance region in the anode current-anode voltage characteristic, said cathode being electrically connected to said anode through an external load circuit, the temperature of said cathode being sufficiently high to effect thermionic emission therefrom and the temperature of said anode being below the temperature of said cathode and sufficiently low that the thermionic emission from said anode is negligible in comparison with the thermionic emission from said cathode, said cathode having a thermionic work function sufficiently greater than the thermionic work function of said anode to move the negative-resistance portion of the anode current-anode voltage characteristic into the area of negative anode voltage, the impedance of said external load being such that the load line therefor intersects the negative-resistance portion of the anode current-anode voltage characteristic in two points.

10. The thermoelectric converter of claim 9 wherein said gaseous mixture is fission-product krypton at a pressure between 10 and 150 mm. of mercury.

11. The thermoelectric converter of claim 9 wherein said radiation-emitting gas is radon.

12. The thermoelectric converter of claim 9 wherein said cathode is tungsten and said anode is oxide cathode material.

13. The thermoelectric converter of claim 9 wherein said gaseous mixture contains at least 99% by volume of at least one gas selected from the group consisting of krypton, argon, xenon, and isotopes thereof.

14. The thermoelectric converter of claim 9 wherein the thermionic emission from said anode is less than about 0.1% of the thermionic emission from said cathode.

15. A thermoelectric converter comprising a cathode and an anode disposed in a rare gas within a container, said cathode being electrically connected to said anode from an external load circuit, the temperature of said cathode being sufficiently high to effect thermionic emission therefrom and the temperature of said anode being below the temperature of said cathode and sufficiently low that the thermionic emission from said anode is negligible in comparison with the thermionic emission from said cathode; and means for radiating said container and said cathode and anode with gamma rays so as to produce high-energy electrons which ionize said rare gas, the pressure of said rare gas and the dose rate of said high-energy electrons being sufficient to produce an ion concentration sufficiently high to make the current output of said converter temperature dependent, said rare gas containing a sufficient amount of at least one gas selected from the group consisting of krypton, argon, xenon, and isotopes thereof to produce a negative-resistance region in the anode current-anode voltage characteristic, said cathode having a thermionic work function sufficiently greater than the thermionic work function of said anode to move the negative-resistance portion of the anode current-anode voltage characteristic into the area of negative-anode voltage, the impedance of said external load being such that the load line therefor intersects the negative-resistance portion of the anode current-anode voltage characteristic in two points.

16. The thermoelectric converter of claim 15 wherein said means for irradiating said container and said cathode and anode with gamma rays is cobalt-60.

17. The thermoelectric converter of claim 15 wherein said means for irradiating said container and said cathode and anode with gamma rays is a nuclear reactor.

References Cited by the Examiner
UNITED STATES PATENTS

| | | |
|---|---|---|
| 2,953,684 | 9/1960 | MacHutchin et al. __ 313—544 X |
| 2,980,819 | 4/1961 | Feaster _______________ 310—4 |
| 3,018,376 | 1/1962 | Vanderschmidt _____ 313—54 X |
| 3,019,358 | 1/1962 | Ohmart ___________ 313—54 X |
| 3,028,490 | 4/1962 | Guilleux __________ 313—54 X |
| 3,054,914 | 9/1962 | Hotsopoulos et al. _____ 310—4 |

FOREIGN PATENTS 797,872   7/1958   Great Britain.

OTHER REFERENCES

Soviet J. of Atomic Energy, March 1961, vol. 7, No. 5, pp. 960–962.

ORIS L. RADER, *Primary Examiner.*

REUBEN EPSTEIN, *Examiner.*

D. X. SLINEY, *Assistant Examiner.*